United States Patent
Bedore et al.

[11] Patent Number: 6,092,545
[45] Date of Patent: Jul. 25, 2000

[54] MAGNETIC ACTUATED VALVE

[75] Inventors: Daniel Blaine Bedore; Gary Lester Goldberg, both of San Diego, Calif.

[73] Assignee: Hamilton Sundstrand Corporation, Windsor Locks, Conn.

[21] Appl. No.: 09/150,714

[22] Filed: Sep. 10, 1998

[51] Int. Cl.$^7$ ................ G05D 7/00; G05D 9/00
[52] U.S. Cl. ................ 137/102; 137/112; 251/65
[58] Field of Search ............... 137/102, 112, 137/528; 251/65; 123/516, 520; 141/DIG. 1

[56] References Cited

U.S. PATENT DOCUMENTS

| | | |
|---|---|---|
| 2,569,316 | 9/1951 | Jerman . |
| 2,646,071 | 7/1953 | Wagner . |
| 2,667,895 | 2/1954 | Pool et al. . |
| 2,705,501 | 4/1955 | Fritzsch ................ 137/112 |
| 2,949,931 | 8/1960 | Ruppright . |
| 3,026,903 | 3/1962 | Roach . |
| 3,495,620 | 2/1970 | Raimondi et al. . |
| 4,275,759 | 6/1981 | Huang ................ 137/528 |
| 4,852,528 | 8/1989 | Richeson et al. ........... 123/90.11 |
| 4,873,948 | 10/1989 | Richeson et al. ........... 123/90.11 |
| 4,874,012 | 10/1989 | Velie . |
| 4,878,464 | 11/1989 | Richeson, Jr. ........... 123/90.11 |
| 4,883,025 | 11/1989 | Richeson, Jr. ........... 123/90.11 |
| 4,899,700 | 2/1990 | Richeson, Jr. et al. ........... 123/90.11 |
| 4,940,207 | 7/1990 | Katsuyama ................ 251/65 |
| 5,076,221 | 12/1991 | Kawamura ................ 123/90.11 |
| 5,095,856 | 3/1992 | Kawamura ................ 123/90.11 |
| 5,320,136 | 6/1994 | Morris et al. . |

*Primary Examiner*—Steven O. Douglas
*Assistant Examiner*—Timothy L. Maust
*Attorney, Agent, or Firm*—Wood, Phillips, VanSanten, Clark & Mortimer

[57] ABSTRACT

A self actuating valve (10) including a housing (12) and a flow control member (14), and magnetic material (16, 17) integral with the housing (12) and the flow control member (14), respectively, with at least one of the magnetic material (16, 17) being permanently magnetized. The housing (12) includes a flow control chamber (18) and first, second, and third ports (20, 22, 24) connected to the chamber (18). The flow control member (14) is mounted in the chamber (18) for movement between first and second positions. In the first position, the member (14) blocks flow between the first and second ports (20, 22), blocks flow between the first and third ports (20, 24) and allows flow between the second and third ports (22, 24). In the second position, the member (14) allows flow between the first and second ports (20, 22) and blocks flow to the third port (24) from both the first port (20) and the second port (22). The magnetic material (16, 17) generates a magnetic force between the housing (12) and the flow control member (14) that is greater with the flow control member (14) in the first position than with the flow control member (14) in the second position.

9 Claims, 1 Drawing Sheet

MAGNETIC ACTUATED VALVE

FIELD OF THE INVENTION

This invention relates to valves, and more particularly, to purge valves utilized in the fuel supply line of an engine.

BACKGROUND OF THE INVENTION

It is known to utilize a spring in a valve to move a flow control member, such as a valve spool or poppet, between different operating positions within the valve. Conventional spring-biased check valves are one example of such valves. In some spring biased valves, the spring biases the valve spool or poppet to an "open" position until a pressure force overcomes the spring force and moves the valve spool or poppet to a closed position where a sealing force from a pressure differential produces a seal between the valve spool or poppet and the valve housing.

One problem associated with such valves is that the maximum spring force opposes the required seating force when the valve spool or poppet is in the closed position. This may prevent an adequate seal between the valve spool or poppet and the valve housing. This problem is particularly relevant to purge valves utilized in the fuel supply line of an engine. Commonly, purge valves utilize a valve spool or poppet that is spring biased towards a purge/fuel shut-off position where the fuel is to be purged from a purge port while preventing fuel flow to the engine. When the fuel system is activated, high pressure fuel in a fuel supply line acts against the spring bias to force the valve spool or poppet to a purge closed/fuel open position where the valve spool or poppet is seated against the purge port to prevent fuel leakage from the purge port while allowing fuel flow to the engine. For such purge valves, it is important that an adequate seal be formed in the purge closed/fuel open position to prevent fuel leakage from the purge port. However, as noted above, the bias force of the spring tends to reduce the sealing force, thereby potentially preventing an adequate seal. Further, because the spring biases the valve spool to the purge/fuel shut-off position, pressure fluctuations in the fuel supply line may cause the purge valve to inadvertently shut-off fuel flow to the engine. Such inadvertent shut-offs can be prevented by designing a sufficiently large "dead band" for the valve where the anticipated pressure fluctuations in the fuel supply line will not result in the valve spool moving to the purge/fuel shut-off position. In spring biased purge valves, such a "dead band" is typically provided by including a sufficiently large amount of travel for the valve spool between the open and closed positions. However, the required length of travel may result in a valve that cannot be conveniently packaged within the envelope for the fuel supply system, and may result in an unacceptably large response time for the valve.

A further problem associated with such valves is that the springs may add to the moving mass of the valve spool or poppet, thereby slowing the response time in the valve. Yet another problem associated with such valves is the potential for spring breakage or relaxation that may cause valve failure.

Thus, it can be seen that there is a need for a new and improved valve, and in particular a new and improved purge valve, that eliminates some, or all, of the above discussed problems associated with spring biased valves.

SUMMARY OF THE INVENTION

It is the principal object of the invention to provide a new and improved valve.

It is another object of the invention to provide a purge valve that is normally biased towards a purge/fuel shut-off position by a biasing force that is reduced, rather than increased, when the valve is moved from the purge/fuel shut-off position.

It is still another object of the invention to provide a purge valve that does not require a spring for operation.

An exemplary embodiment of the invention achieves at least some of the foregoing objects in a valve including a housing and a flow control member. The housing includes a flow control chamber and first, second, and third ports connected to the chamber. The flow control member is mounted in the chamber for movement between: a) a first position where the member blocks flow between the first and the second or third ports, and allows flow between the second and third ports; and b) a second position where the member allows flow between the first and second ports and blocks flow to the third port from both the first port and the second port. At least a portion of the housing and at least a portion of the flow control member include magnetic material arranged to generate a magnetic force between the housing and the flow control member that is greater with the flow control member in the first position than with the flow control member in the second position. At least one of said portions is permanently magnetized.

In one form, the flow control member further includes a first surface that is acted on by fluid pressure at the first port, and a second surface that is acted on by fluid pressure at the third port. The magnet material has sufficient magnetic power to move the member from the second position to the first position with the pressure at the second port being equal to the pressure at the first port.

In one form the magnetic material of the flow control member is permanently magnetized and the magnetic material of the housing is not permanently magnetized.

In one form the magnetic material of the flow control member is not permanently magnetized and the magnetic material of the housing is permanently magnetized.

In one form the magnetic material of both the flow control member and the housing is permanently magnetized.

DETAILED DESCRIPTION OF THE PREFERRED EMBODIMENT

The invention is illustrated and described herein embodied in a purge valve 10 for use in a fuel control system. However, it should be understood that the invention will find use in many other forms, and that no limitations to a purge valve or to use with a fuel system are intended except for as expressly recited in the claims.

Figure 1:
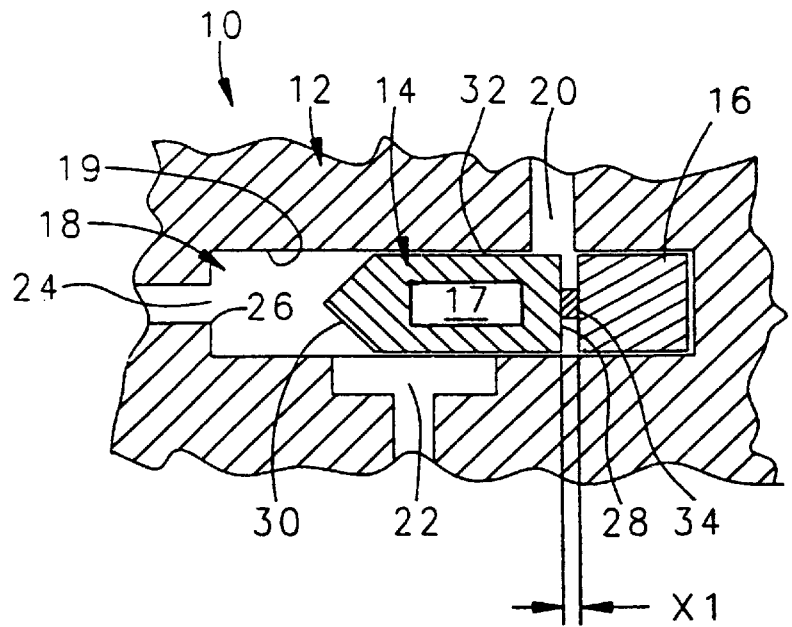
FIG. 1 is a diagrammatic illustration of a valve embodying the invention with a flow control member shown in a first position.
Figure 2:
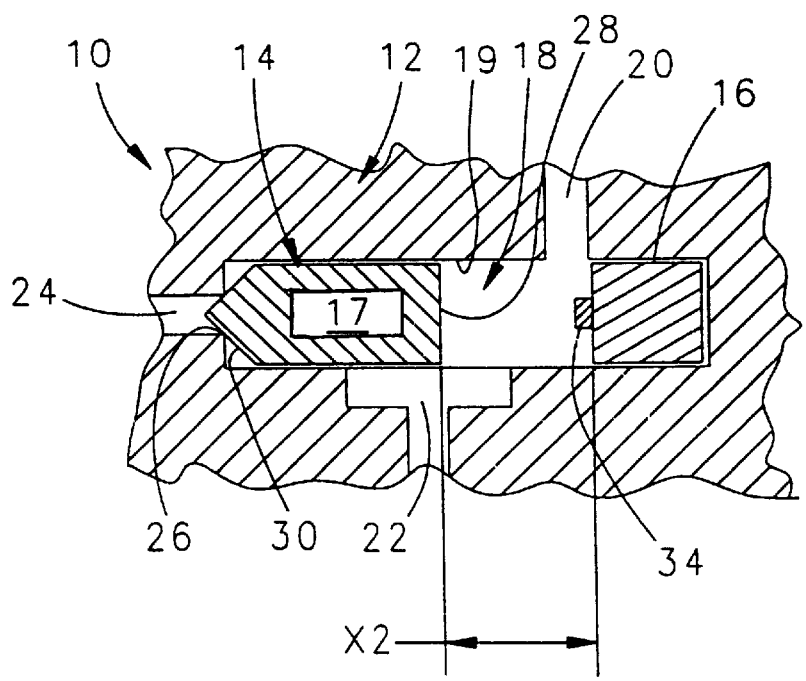
FIG. 2 is a diagrammatic illustration of the valve shown in FIG. 1, with the flow control member shown in a second position.

As seen in FIGS. 1 and 2, the purge valve 10 includes a housing 12, a flow control member 14 in the form of a valve spool having a generally cylindrical cross-section, and magnetic material 16, 17 integral with the housing 12 and the flow control member 14, respectively, with at least one of the magnetic material 16, 17 being permanently magnetized.

The housing includes a flow chamber 18 shown in the form of a cylindrical bore defined by cylindrical surface 19, an inlet port 20 to the chamber 18, a first outlet port 22 from the chamber, and a second outlet port 24 from the chamber. The inlet port 20 is supplied with pressurized fuel from a fuel supply line of a fuel control system (not shown). The first outlet port 22 directs fuel flow to the downstream portion of the fuel control system. The second outlet port 24 is a purge port that allows fuel to be purged from the downstream portion of the fuel control system after back flowing through the port 22. The second outlet port 24 includes a valve seat 26 against which the flow control member 14 may close.

The flow control member 14 includes a pressure responsive end surface 28 that is acted on by the pressure of fuel at the port 20, and an opposite conical end surface 30 that is acted upon by the pressure at the port 24. As seen in FIG. 2, the surface 30 acts as a poppet and is adapted to seal against the valve seat 26 when the flow control member 14 is in the second position. The flow control member 14 also includes an outermost cylindrical surface 32 that acts as a spool and cooperates with the cylindrical surface 19 of the flow chamber 18 to prevent an unwanted flow of fuel from the port 20 to the ports 22, 24 when the flow control member 14 is in the first position shown in FIG. 1.

As seen in FIGS. 1 and 2, the valve member 14 is mounted in the chamber 18 to translate between the first or "purge/ fuel shut-off" position shown in FIG. 1, and a second or "purge closed/fuel open" position shown in FIG. 2. In the first position shown in FIG. 1, the valve member 14 blocks flow from the port 20 to the ports 22 and 24 while allowing flow between the ports 22 and 24. This allows the fuel in the downstream portion of the fuel control system to be purged through the port 24 after back flowing through the port 22, while fuel in the port 20 is retained in the fuel supply line to reduce "fill time" when the fuel control system is activated to supply fuel to the downstream portion of the fuel control system. When the valve member 14 is in the second position shown in FIG. 2, the valve member 14 allows flow from the port 20 to the port 22 and blocks flow to the port 24 from both the port 20 and the port 22. This allows fuel flow through the fuel control system without an undesirable leakage of fuel to or from the purge port 24.

Either, or both, of the magnetic material 16 of the housing 12 and the magnetic material 17 of the flow control member 14 can be permanently magnetized, as long as at least one of the magnetic material 16, 17 is permanently magnetized and the magnetic material 16, 17 are arranged to generate a magnetic force between the housing 12 and the flow control member 14 that is greater with the flow control member 14 in the first position shown in FIG. 1 than with the flow control member 14 in the second position shown in FIG. 2. In this regard, it should be understood that there are many possible configurations that will achieve the desired results. For example, it should be understood that the housing 12 and/or the flow control member 14 can be made partially, or completely, of magnetic material. Alternatively, the housing 12 and/or the member 14 may include a magnetic component or coating that is fixed to the valve member 14. Preferably, the magnetic material 16, 17 has sufficient magnetic power to move the member 14 from the second position shown in FIG. 2 to the first position shown in FIG. 1 when the pressure at the port 24 is equal to or greater than the pressure at the port 20. Alternately, a spring could be added the end near port 24 to assist in moving the member 14 from the second position at a specified differential pressure between the ports 20 and 24, while keeping the spring force much lower than traditional spring biased valves.

In one embodiment, the member 14 is formed completely from magnetic material 17, and the magnetic material 16 is a permanent magnet that is fixed in the housing 12 adjacent the chamber 18 at a location that is spaced opposite from the port 24. The permanent magnet 16 is mounted on the housing 12 so that the magnet 16 is located at a greater distance from the member 14 with the member 14 in the second position than with the member 14 in the first position. The permanent magnet 16 is oriented in the housing 12 to generate a magnetic force on the valve member 14 that biases the member 14 towards the first position shown in FIG. 1. A non-magnetic spacer 34 provides a gap X1 that allows the fuel pressure from the inlet port to act on the surface 28 and, because the magnetic force between the magnetic material 16 and 17 is dependent on distance, determines the fuel pressure at which the valve "cracks" and the member 14 moves from the first position. Preferably, the permanent magnet 16 has sufficient magnetic power to move the valve member 14 from the second position shown in FIG. 2 to the first position shown in FIG. 1 when the pressure at the port 24 is equal to or greater than the pressure at the port 20.

In operation, the fuel control system is activated to provide pressurized fuel from the fuel supply line to the port 20. The valve member 14 moves from the first position in FIG. 1 to the second position in FIG. 2 when the fuel pressure from the inlet port 20 acting on the surface 28 is sufficient to overcome both the pressure at the outlet ports 22 and 24 acting on the surface 30 and the magnetic force between the magnetic material 16 and 17. It should be noted that, because the magnetic force drops off in proportion to the square of the distance between the magnetic material 16 and 17, the member 14 will move to the second position without any further increase in the fuel pressure at the inlet 20. This is in contrast to a valve system where, for example, the valve member 14 is spring biased to the position shown in FIG. 1. In such a case, movement of the valve member 14 toward the FIG. 2 position would be met with ever increasing resistance as the biasing spring is increasingly loaded.

Further, the member 14 will remain in the second position even for fuel pressures at the inlet that are less than the pressure initially required to move the member 14 from the first position. Thus, the member 14 is in effect "latched" in the second position after it has been moved from the first position. This is particularly advantageous for fuel purge valves, which require good sealing in the closed position to prevent undesirable fuel leakage during operation of the fuel control. Further, this provides a desirable "dead band" for the valve 10 without requiring excessive length to be added to the path of movement of the valve member 14 which would increase response time. As previously noted, such a "dead band" is desirable to prevent intermittent shut-offs of the fuel flow when the pressure in the fuel supply line fluctuates.

When the fuel control system is deactivated, the fuel pressure at the inlet port 20 is reduced until the pressure at the outlet port 24, if any, acting on the surface 30 and/or the magnetic force of the magnet 16 on the material 34 overcome the pressure at the inlet port 20 acting on the surface 28 and move the member 14 from the second position to the first position.

It should be appreciated that by blocking flow from the inlet port 20 to the outlet port 22, the valve 10 allows for fuel to be retained in a fuel supply line (not shown) connected to the inlet port 20, thereby reducing the "fill time" required when the fuel control system is reactivated.

It should further be appreciated that, because the magnetic force acting on the valve member 14 is lower in the second position than in the first position, the sealing force between the surface 30 and the seat 26 is maximized, thereby minimizing undesirable leakage of fuel through the port 24.

It should also be appreciated that the reaction time for the valve 10 may be optimized because the valve 10 does not require a spring, with its associated inertia, for its operation.

Finally, it should also be appreciated that the potential for the valve 10 to become jammed or inoperative due to a failed component is reduced because the valve 10 does not require a biasing spring.

What is claimed is:

1. A valve comprising:
   a housing including a flow control chamber and first, second, and third ports connected to the chamber; and
   a flow control member mounted in the chamber for movement between
   a) a first position where the member blocks flow between the first and second ports, blocks flow between the first and third ports, and allows flow between the second and third ports, and
   b) a second position where the member allows flow between the first and second ports and blocks flow to the third port from both the first port and the second port; wherein
   at least a portion of the housing and at least a portion of the flow control member including magnetic material arranged to generate a magnetic force between the housing and the flow control member that is greater with the flow control member in the first position than with the flow control member in the second position, at least one of said portions being permanently magnetized; wherein the member further comprises a first surface that is acted on by fluid pressure at the first port, and a second surface that is acted on by fluid pressure at the third port; and wherein the magnetic material has sufficient magnetic power to move the member form the second position to the first position whenever the pressure at the third port is equal to the pressure at the first port.

2. The valve of claim 1 wherein the member is mounted in the chamber for translational movement between the first and second positions.

3. The valve of claim 2 wherein the flow control chamber and member are defined by nominally cylindrical surfaces.

4. The valve of claim 1 wherein the third port includes a valve seat surface engageable with a surface on the flow control member to block flow through the third port with the flow control member in the second position.

5. The valve of claim 1 wherein the magnetic material of the housing is a permanent magnet.

6. The valve of claim 5 wherein the permanent magnet is mounted on the housing so that the magnet is located at a greater distance from the flow control member with the flow control member in the second position than with the member in the first position.

7. The valve of claim 1 wherein the magnetic material of the flow control member is a permanent magnet.

8. The valve of claim 1 wherein the magnetic material of the housing is not permanently magnetized.

9. The valve of claim 1 wherein the magnetic material of the flow control member is not permanently magnetized.

* * * * *